(12) United States Patent
Asano

(10) Patent No.: US 8,848,210 B2
(45) Date of Patent: Sep. 30, 2014

(54) EVENT NOTIFICATION SYSTEM IN WHICH A TERMINAL IS NOTIFIED OF EVENTS GENERATED IN DEVICES VIA A NETWORK

(71) Applicant: Takehiko Asano, Osaka (JP)

(72) Inventor: Takehiko Asano, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 13/753,980

(22) Filed: Jan. 30, 2013

(65) Prior Publication Data

US 2013/0194604 A1 Aug. 1, 2013

(30) Foreign Application Priority Data

Jan. 30, 2012 (JP) .................................. 2012-016356
Jan. 30, 2012 (JP) .................................. 2012-016357
Jan. 30, 2013 (EP) ...................................... 13153310

(51) Int. Cl.
*H04N 1/00* (2006.01)
*G06K 15/02* (2006.01)
*G06F 3/12* (2006.01)

(52) U.S. Cl.
CPC .......... *H04N 1/00114* (2013.01); *G06F 3/1259* (2013.01); *G06K 15/1803* (2013.01); *G06F 3/121* (2013.01); *G06F 3/1207* (2013.01); *G06F 3/1229* (2013.01); *G06F 3/1285* (2013.01)
USPC ........................................ 358/1.13; 358/1.15

(58) Field of Classification Search
USPC .............................................. 358/1.13–1.15
See application file for complete search history.

(56) References Cited

U.S. PATENT DOCUMENTS

| 2004/0162870 | A1 | 8/2004 | Matsuzaki et al. |
| 2006/0007480 | A1 | 1/2006 | Yokokura |
| 2006/0291453 | A1 | 12/2006 | Kuwahara |
| 2007/0208837 | A1 * | 9/2007 | Tian et al. |
| 2007/0276737 | A1 * | 11/2007 | Joao ................................ 705/21 |
| 2008/0228915 | A1 | 9/2008 | Tamura |
| 2013/0024914 | A1 * | 1/2013 | Ahmed et al. ..................... 726/4 |

FOREIGN PATENT DOCUMENTS

JP 2004-234648 A 8/2004
JP 2005-107837 4/2005

(Continued)

OTHER PUBLICATIONS

European Search Report for App. No. EP 13153310.1, mailed Jan. 3, 2014.

*Primary Examiner* — Qian Yang
(74) *Attorney, Agent, or Firm* — McDonnell Boehnen Hulbert & Berghoff LLP

(57) ABSTRACT

An event notification system includes a terminal and devices coupled thereto via a network that process jobs provided from the terminal The device includes a database in which a subscription including an event type and a notification address is registered on the basis of a notification registration request from the terminal In the device, an event generator generates an event with event data indicating a status change within the device. Given the status change of a job, a value indicating a requestor of the job process is included in the event data. When the event data includes the requester, an event notification manager sends a notification to the notification address in the subscription including the values of the status change and the requester, and sends the notification to the notification address in the subscription including the value of the status change.

13 Claims, 15 Drawing Sheets

(56) References Cited

FOREIGN PATENT DOCUMENTS

| JP | 2006-023830 | | 1/2006 |
| JP | 2006-239930 | A | 9/2006 |
| JP | 2007-013232 | A | 1/2007 |
| JP | 2007-226805 | A | 9/2007 |
| JP | 2008-233994 | | 10/2008 |
| JP | 2009-070182 | | 4/2009 |
| JP | 2009-230477 | | 10/2009 |

* cited by examiner

| NAME | TYPE | DATA |
|---|---|---|
| StatusMonitor | REG_DWORD | 0x00000000 |
| IPAddress | REG_SZ | 192.168.2.1 |
| Notification1 | REG_MULTI_SZ | JobStatus 1 1 |
| Notification2 | REG_MULTI_SZ | PrinterStatus 0 0 |

| SUBSCRIPTION ID | EVENT TYPE CODE | USER ID | IP ADDRESS | TIME STAMP | FLAG |
|---|---|---|---|---|---|
| 1 | 01 | TARO.SUZUKI | 192.168.2.12 | 20120116:091228 | 1 |
| 2 | 01 | TARO.SUZUKI | 192.168.2.15 | 20120118:103651 | 1 |
| 3 | 02 | JIRO.MAEDA | 192.168.2.12 | 20120117:134709 | 1 |
| ⋮ | ⋮ | ⋮ | ⋮ | ⋮ | ⋮ |

FIG. 5C

| SUBSCRIPTION ID | COMBINED EVENT CODE | IP ADDRESS | TIME STAMP | FLAG |
|---|---|---|---|---|
| 1 | TARO.SUZUKI:01 | 192.168.2.12 | 20120116:091228 | 1 |
| 2 | TARO.SUZUKI:01 | 192.168.2.15 | 20120118:103651 | 1 |
| 3 | JIRO.MAEDA:02 | 192.168.2.12 | 20120117:134709 | 1 |
| ⋮ | ⋮ | ⋮ | ⋮ | ⋮ |

EVENT NOTIFICATION SYSTEM IN WHICH A TERMINAL IS NOTIFIED OF EVENTS GENERATED IN DEVICES VIA A NETWORK

INCORPORATION BY REFERENCE

This application is based upon, and claims the benefit of priority from, corresponding Japanese Patent Application Nos. 2012-016356 and 2012-016357, filed in the Japan Patent Office on Jan. 30, 2012, the entire contents of which is incorporated herein by reference.

FIELD

The present disclosure relates to an event notification system in which a plurality of devices are coupled to a terminal via a network. In response to requests made to the devices from the terminal, the terminal is notified of events generated in the devices on the basis of registered types of events and notification addresses.

BACKGROUND

A system supports the notification of events generated in devices, such as image forming devices, where the notification may be transmitted to a terminal via a network that is specified in a web services eventing protocol, such as the WS-Eventing protocol. According to the WS-Eventing specification, only a terminal that requests registration is notified of events corresponding to the request and there is no need to provide a management device.

However, every time the event occurs, the image forming device needs to search a table that stores information regarding correspondences between the types of the events and the addresses of registrants. Further, the table is used to determine whether or not the notification is the type of event that needs to be transmitted to the only terminal that requested the processing of a job. Hence, the processing load of the image forming device can be alleviated.

Further, for example, consider a user who has requested the image forming device to process a print job from a desktop personal computer (PC), which is a first terminal. The user may then move away from the first terminal to attend a meeting and uses a notebook personal computer, which is a second terminal As such, the user cannot receive the notification of completing the printing job.

As such, the above-described problem may be encountered not only in an image forming device connected to a network but also in other devices connected to the network.

SUMMARY

The present disclosure relates to an event notification system that allows the processing load of a device to be alleviated even when the system has a configuration in which an event notification is sent only to a terminal that has requested job processing.

Further, the present disclosure relates to an event notification system such that when a user has requested the device to process a job from a first terminal, the same user may receive, from the device notifications, changes in job status even when the user moves to a second terminal.

An event notification system according to an embodiment of the present disclosure includes a terminal and a plurality of devices, where each of the plurality of devices includes a processor and a memory unit, and where the plurality of devices is configured to be coupled to the terminal via a network, and process a job provided from the terminal The memory unit includes: a database in which a subscription is registered on the basis of a notification registration request provided from the terminal, where the subscription includes an event type and a notification address; an event generator; and an event notification manager. The event generator is configured to cause the processor to generate an event including event data and a value indicating a status change within the device, and when the status change indicates a status change of the job, a value indicating a requestor of a job process is included in the event data. In response to the event generation, (i) when the event data includes the value indicating the requester of the job process, the event notification manager is configured to cause the processor to send an event notification to the notification address included in the subscription, among other subscriptions included in the database, and where the event notification includes the value indicating the status change as the event type and the value indicating the requester of the job process, and (ii) when the event data does not include the value indicating the requester of the job process, the event notification manager is configured to cause the processor to send the event notification to the notification address included in the subscription, among the other subscriptions included in the database, and the event notification includes the value indicating the status change as the event type.

An event notification system according to another embodiment of the present disclosure includes a terminal including a printer driver and a plurality of devices, where each of the plurality of devices include a processor and a memory unit, and where the plurality of devices is configured to be coupled to the terminal via a network, and process a job provided from the terminal via the printer driver. The memory unit stores a database in which a subscription is registered on the basis of a request for event notification registration provided from the terminal, and stores an event notification program, where the subscription includes a notification address and an event type as a filter element. The subscription further includes a first user ID as the filter element when the event type is a job status and the printer driver provides a second user ID with job data of the job processed by the device. In response to an event generation in the device, when the event type is the job status, the event notification program causes the processor to send an event notification to the notification address included in the subscription, among other subscriptions included in the database, in which the event type is the job status and the first user ID is matched with the second user ID.

A computer-implemented method according to another embodiment of the present disclosure includes: registering a subscription in a database on the basis of an event registration request provided from a terminal, where the subscription includes an event type and a notification address. Further, the computer-implemented method includes generating, by at least a central processing unit, an event including event data and a value indicating a status change, where when the status change indicates a status change of a job, a value indicating a requestor of a job process is included in the event data. Yet further, the computer-implemented method includes sending, when the event data includes the value indicating the requester of the job process, an event notification to the notification address included in the subscription, among other subscriptions included in the database, where the event notification includes the value indicating the status change as the event type and the value indicating the requester of the job process. In addition, the computer-implemented method includes sending, when the event data does not include the value indicating the requester of the job process, the event notification to the notification address included in the subscription, among the other subscriptions included in the database, where the event notification includes the value indicating the status change as the event type. Additional features and advantages are described herein, and will be apparent from the following Detailed Description and the figures.

BRIEF DESCRIPTION OF FIGURES

In the accompanying drawings:

FIG. 4 is a schematic diagram illustrating setting data regarding a printer driver registered in a registry;

FIG. 5C is a schematic diagram illustrating a configuration of a subscription table included in the event database;

FIG. 11 is a schematic diagram illustrating a configuration of the subscription table according to a second embodiment;

DETAILED DESCRIPTION

First Embodiment

Figure 1:
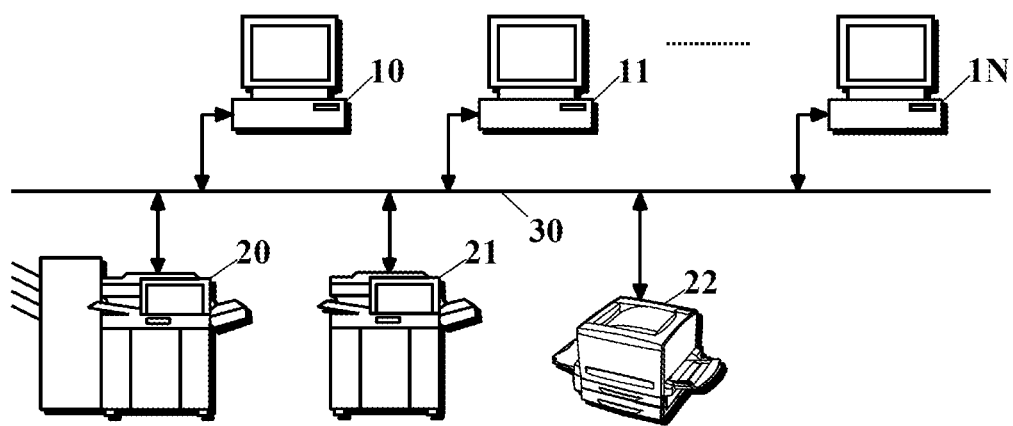
FIG. 1 is a schematic diagram illustrating a configuration of an event notification system via a network according to a first embodiment of the present disclosure.

FIG. 1 is a schematic diagram illustrating the configuration of an event notification system according to a first embodiment of the present disclosure.

In the event notification system, a plurality of personal computers (PCs) 10-1N serving as terminals are coupled by a network 30 to image forming devices 20-22 serving as devices used by the PCs. Note that, a configuration of the image forming device 20 is similar with the configurations of the image forming devices 21 and 22, and the configuration of PC 10 is similar with the configurations of the PCs 11-1N.

Figure 2:
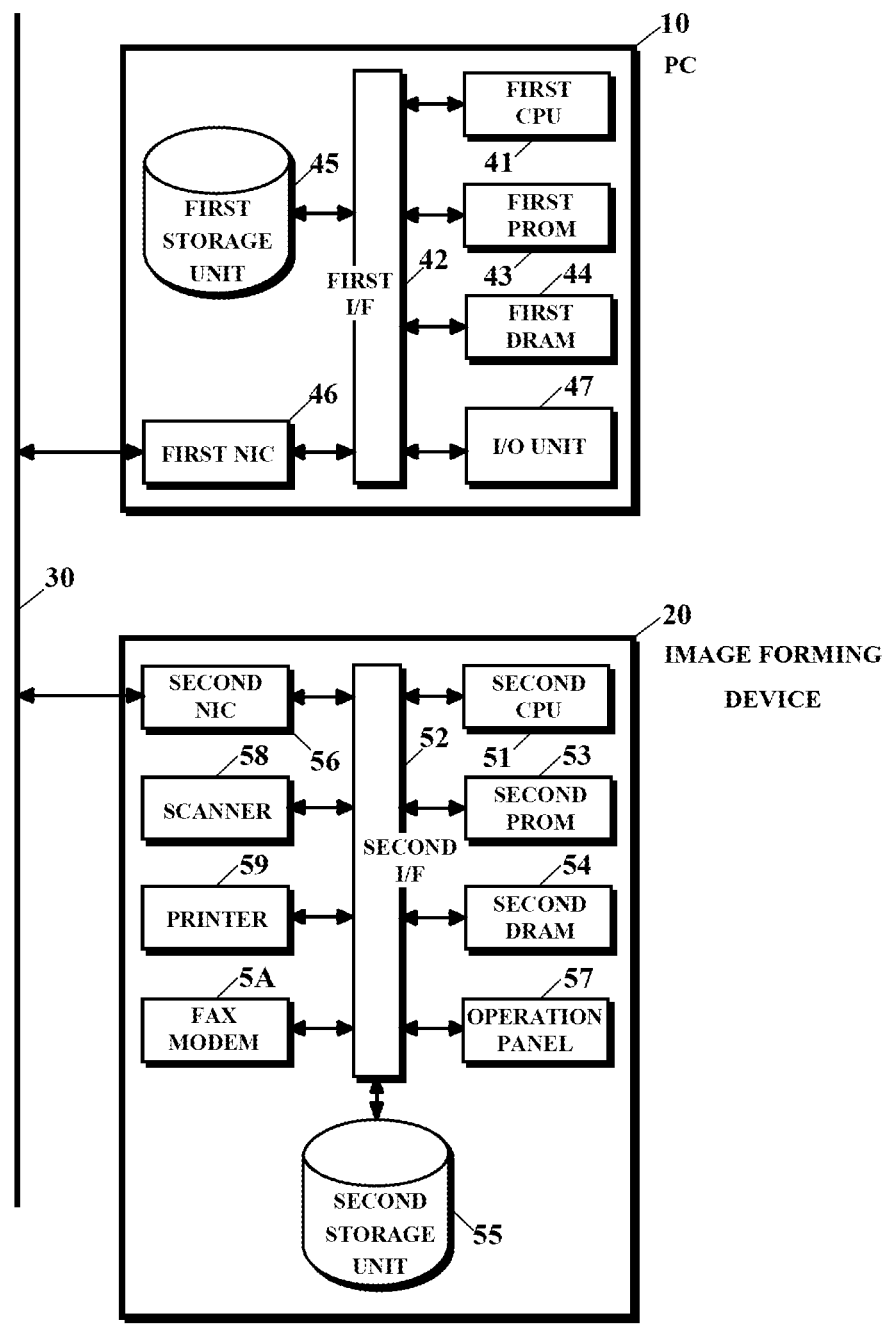
FIG. 2 is a block diagram illustrating hardware configurations of a personal computer (PC) and an image forming device.

FIG. 2 is a block diagram illustrating the hardware configurations of the PC 10 and the image forming device 20.

In the PC 10, a first CPU 41 is coupled to a first PROM 43, a first DRAM 44, a first storage unit 45, a first network interface card (NIC) 46, and an input/output (I/O) unit 47 via a first interface (I/F) 42. In FIG. 2, a plurality of interfaces are represented by the first interface 42.

The first PROM 43 is, for example, a flash memory and stores a basic input/output system (BIOS). The first DRAM 44 is used as a first main memory unit. The first storage unit 45 stores an operating system (OS), various drivers and applications, and data. The drivers and applications include some components in the PC 10. The NIC 46 is coupled to the network 30. The input/output unit 47 is coupled to the network 30. The I/O unit 47 includes, for example, a keyboard, a pointing device, and a display.

In the image forming device 20, a second CPU 51 is coupled to a second PROM 53, a second DRAM 54, a second storage unit 55, a second NIC 56, an operation panel 57, a scanner 58, a printer 59, and a fax modem 5A via a second I/F 52. In FIG. 2, a plurality of interfaces are represented by the second interface 52.

The second PROM 53 stores a BIOS, an OS, various drivers, and a plurality of applications for realizing the functions of an image forming device 20. The second DRAM 54 is used as a second main memory unit. The second storage unit 55 stores print data, image data read by the scanner 58, files, and received facsimile data. The second NIC 56 is coupled to the network 30. The operation panel 57 includes an input unit and a display. The scanner 58 is used to generate image files and the files are used for printing, facsimile transmission, or file transmission. The printer 59 includes a print engine, a paper feed unit, a conveying unit, and a paper ejection unit.

Figure 3:
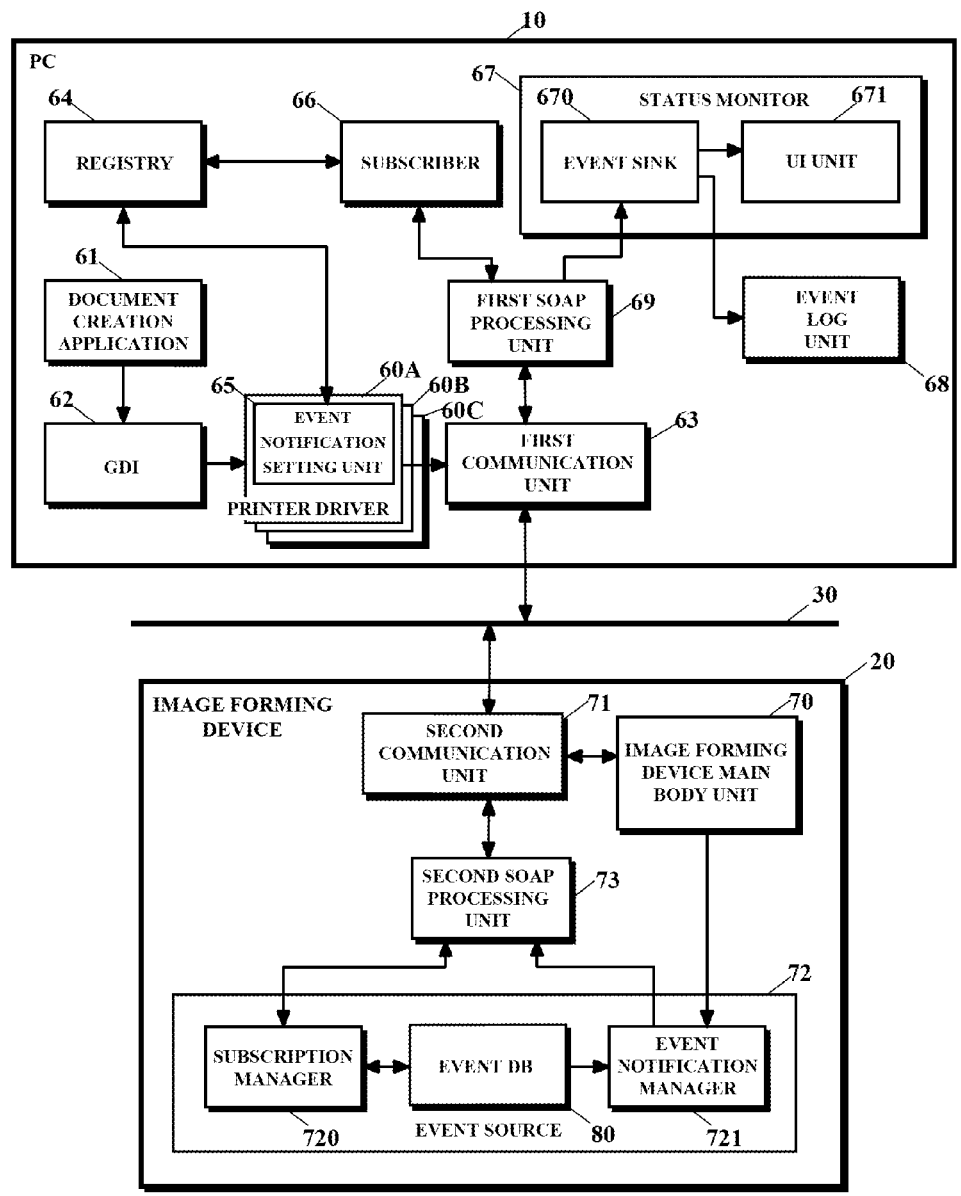
FIG. 3 is a block diagram illustrating functional configurations of the PC and the image forming device in the event notification system.

FIG. 3 is a block diagram illustrating the functional configurations of the PC 10 and the image forming device 20 in the event notification system.

Printer drivers 60A, 60B, and 60C installed on the PC 10 correspond to the image forming devices 20, 21, and 22 illustrated in FIG. 1, respectively. A document is created using a document creation application 61 and a print start command is provided. After setting printing parameters through a dialog box, such as a sheet size, the number of copies, and post process, a print job is provided to the selected printer driver 60A via a graphics device interface (GDI) 62 of the OS. Further, the print job is converted into page description language (PDL) data that may be interpreted by the image forming device 20, and is transmitted to a second communication unit 71 of the image forming device 20 through a first communication unit 63 and the network 30.

In a registry 64 serving as a database, setting data regarding the OS, device drivers, and applications is registered in the form of a tree structure, and the values and data types of entries (keys) may be read and/or written by specifying the paths of the tree.

FIG. 4 is a schematic diagram illustrating the setting data regarding the printer driver 60A registered in the registry 64. Within the setting data, a portion of the setting data below a printer driver node, which is below a printer node, located below the path "HKEY_LOCAL_MACHINE¥SYSTEM¥CurrentControlSet¥Control¥Print¥Printers" of the "Printers" key is illustrated. In FIG. 4, "NAME", "TYPE", and "DATA" are the name, data type, and value of the respective entries.

For example, a "StatusMonitor" key shows that the data type is numeric ("REG_DWORD") and the value is "0 (0x00000000)". In other words, it shows that a status monitor 67 for displaying, in the PC 10, an event generated in the image forming device 20 is set to off. An "IPAddress" key shows that the data type is a character string ("REG_SZ") and the value is "192.168.2.1", which shows that the IP address of the image forming device 20 is "192.168.2.1". A "Notification1" key shows that the data type is a character string array ("REG_MULTI_SZ") and the value is {"JobStatus", "1"}, which shows that the type of event notification from the image forming device 20 to the PC 10 is "JobStatus" and a notification is sent. Similarly, a "Notification2" key shows that the data type is a character string array ("REG_MULTI_SZ") and the value is {"PrintStatus", "0"}, which shows that the type of event notification from the image forming device 20 to the PC 10 is "PrinterStatus" and a notification is not sent.

In FIG. 3, the printer driver 60A includes an event notification setting unit 65. The event notification setting unit 65 allows the setting of the printing parameters to be made such that a status monitor is on or off and a notification is sent or not for each type of event. The printer drivers 60B and 60C similarly include the event notification setting unit 65.

Registration of events in the image forming devices 20-22 performed by the PC 10 and event notification from the image forming devices 20-22 to the PC 10 are performed in accordance with the WS-Eventing specification. In other words, the status monitor 67 is notified of an event generated in the image forming device 20, in accordance with the type of event and a notification address registered in the image forming device 20. Further, the status monitor 67 is notified on the basis of a request for event notification registration from a subscriber 66 to the image forming device 20, and the status monitor 67 displays the event.

The status monitor 67 includes an event sink 670 and a UI unit 671. The event sink 670 records an event for which notification has been provided in an event log unit 68 and notifies the UI unit 671 of the event. The UI unit 671, in response to this, displays the notification content as a pop-up message in a dialog box. The log may be viewed using the event viewer of the OS.

The subscriber 66 and the event sink 670 are both resident programs, which are Windows service applications when the OS is Windows (registered trademark). Note that notification from the event sink 670 to the UI unit 671 may be realized by a method of indirectly calling the UI unit 671 using an "Entry-Written" event that is generated as a result of the event sink 670 recording the event in the event log unit 68.

The subscriber 66 and the event sink 670 are activated by the OS when the OS is activated, and are deactivated by the OS when the OS is deactivated.

When the subscriber 66 calls a Web service method of a SOAP proxy within a first SOAP processing unit 69, the content is serialized in XML and converted into a SOAP message. Further, the content is transmitted to the second communication unit 71 of the image forming device 20 via an HTTP/TCP/IP protocol stack in the first communication unit 63. An event notification message from the image forming device 20, received via the network 30 and the first communication unit 63, is de-serialized in XML by a SOAP listener within the first SOAP processing unit 69 and transferred to the event sink 670 as an event notification object.

In the image forming device 20, print job data is provided to an image forming device main body unit 70 (70A in FIG. 12) via the network 30 and a TCP/IP protocol stack in the second communication unit 71, and the data is developed into a bit map image. The raster data of the bit map image is used to expose an electronic photoconductor drum thereby forming an electrostatic latent image, which is developed using toner. Further, the image is transferred to a sheet, fixed to the sheet, and the sheet is ejected.

On the other hand, a SOAP message from the PC 10 requesting event notification registration is provided to a second SOAP processing unit 73 via the network 30 and the HTTP/TCP/IP protocol stack in the second communication unit 71. Further, the SOAP message is de-serialized in XML and provided to a subscription manager 720 (720A in FIG. 12) of an event source 72 (72A in FIG. 12) as the event notification requesting object. The subscription manager 720, in response to this, registers event notification information in an event database (DB) 80 (80A in FIG. 12).

Figure 5A:
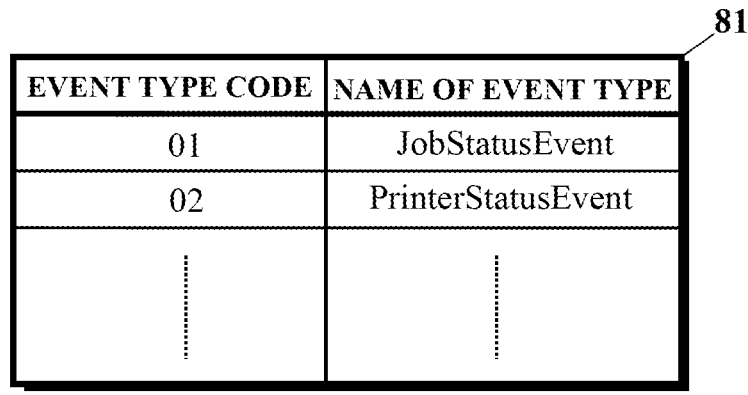
FIG. 5A is a schematic diagram illustrating a configuration of an event type table included in an event database illustrated in FIG. 3.
Figure 5B:
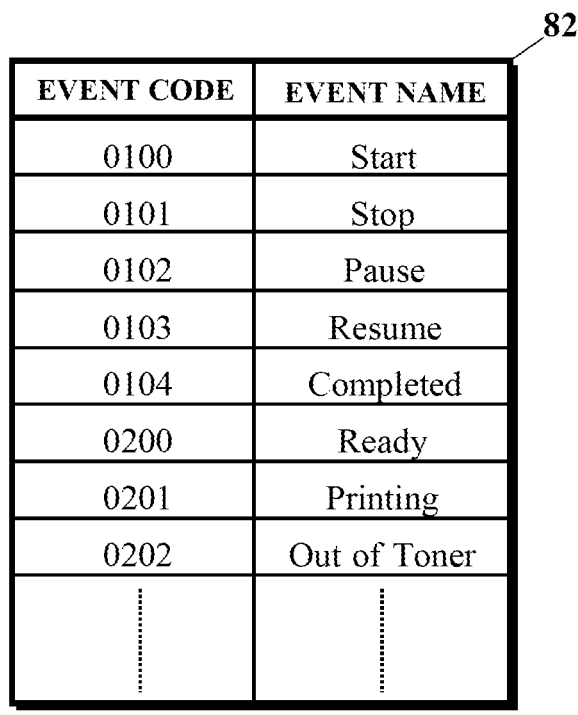
FIG. 5B is a schematic diagram illustrating a configuration of an event table included in the event database.

FIGS. 5A, 5B, an 5C are schematic diagrams respectively illustrating the configurations of an event type table 81, an event table 82, and a subscription table 83 included in the event DB 80. In the event type table 81, the correspondence between the names of event types for which notification can be sent and event type codes is registered. In the event table 82, the correspondence between event names and event codes is registered. For example, the event code is made up of four digits. The two highest-order digits represent the type code of an event and the two lowest-order digits represent an event sub-code that indicates changes in status pertaining to an event type. For example, event codes 0100-0104 show that the event type is "JobStatusEvent" and event codes 0200-0202 show that the event type is "PrinterStatusEvent".

A SOAP message requesting event notification registration includes a "ReplyTo" address (the address of the subscriber 66) including the IP address of a requester, a "NotifyTo" address (the address of the event sink 670) including the IP address of a requester, a "To" address (the address of the subscription manager 720) including the IP address to which the request is sent, and event types as "Filter" elements. Note that the SOAP message requesting event notification registration may further include the user ID ("UserID") of a requester as a "Filter" element when the event type is "JobStatusEvent". In these addresses, default values are used as the port numbers and paths in the PC 10 and the image forming device 20. Addresses described in a configuration file (not illustrated) may be used as these addresses.

In FIG. 3, the subscription manager 720 creates a subscription (row) and registers this in the subscription table 83 illustrated in FIG. 5C on the basis of the content of the SOAP message.

When an event is generated in the image forming device main body unit 70, the code thereof is provided to an event notification manager 721 (721A in FIG. 12) of the event source 72. The event notification manager 721, in response to this, performs process illustrated in FIG. 8 or FIG. 9 every time a row including an event type code identical to the two highest-order digits of the provided code is read from the subscription table 83.

Figure 6A:
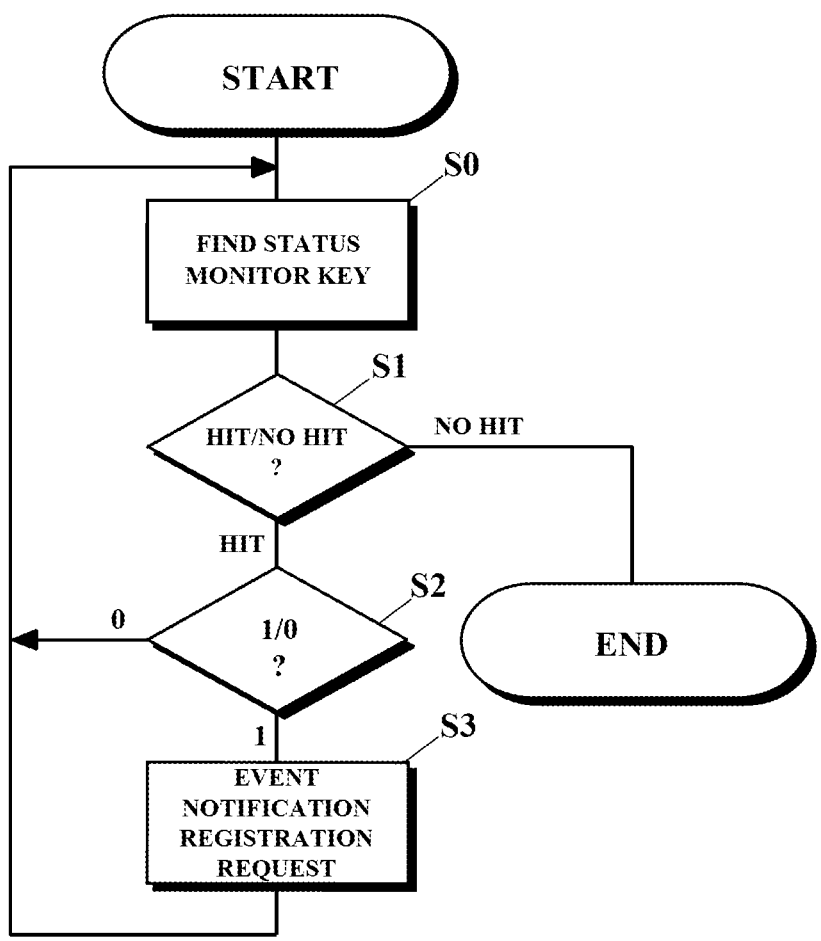
FIG. 6A is a flowchart illustrating event notification registration request process performed by a subscriber.

FIG. 6A is a flowchart illustrating event notification registration request process performed by the subscriber 66 illustrated in FIG. 3. The event notification registration request process is called and executed as a result of the subscriber 66 being called by the OS when the OS is activated. Steps S0-S3 create a loop process performed for each of the printer drivers 60A, 60B, and 60C.

In step S0, an entry having the "StatusMonitor" key is obtained by scanning the keys of a group of keys for the drivers for printers existing below the path of the "Printers" key, on the basis of setting information regarding all the printer drivers 60A, 60B, and 60C registered in the registry 64. Note that the entry may be obtained by directly specifying the path of the "StatusMonitor" key every time a printer driver key is found, if a relative path from the printer driver key is already known.

In step S1, when the "StatusMonitor" key is found (hit), the flow proceeds to step S2, and when the "StatusMonitor" key is not found (not hit), i.e., when all the printer drivers 60A, 60B, and 60C have been searched, process of FIG. 6A ends.

In step S2, the flow proceeds to step S3 when the value of the "StatusMonitor" key is "1", and the flow returns to step S0 when the value of the "StatusMonitor" key is "0".

In step S3, the subscriber 66 obtains an entry having a key including "Notification" from the group of keys that include the "StatusMonitor" key, located below a printer driver key. The value in the event notification registration indicates whether or not the notification is sent. When the value in the event notification registration indicates that the notification is sent, the value of an element having an index of "1" is "1". Further, the subscriber 66 obtains the character string of an element having an index of "0" as an event type. The subscriber 66, when the event type is related to a job, i.e., when the event type is "JobStatusEvent" in the first embodiment, further obtains a login user ID for the OS using a specific path within the registry 64. The subscriber 66 transmits a SOAP message (an event notification registration request) requesting "Subscription" including the event type and/or user ID as the value of a "Filter" element to the subscription manager 720.

The SOAP message includes the address of the subscriber 66 including the IP address of the PC 10 as a "ReplyTo" address, the address of the event sink 670 including the IP address as a "NotifyTo" address, and the address of the subscription manager 720 of the image forming device 20. The address of the subscription manager 720 of the image forming device 20 includes the value of the "IPAddress" key included in the group of keys as the IP address to which a request for event notification registration is sent.

The process in step S3 is performed for each key including "Notification". Then the flow returns to step S0 from step S3.

Figure 6B:
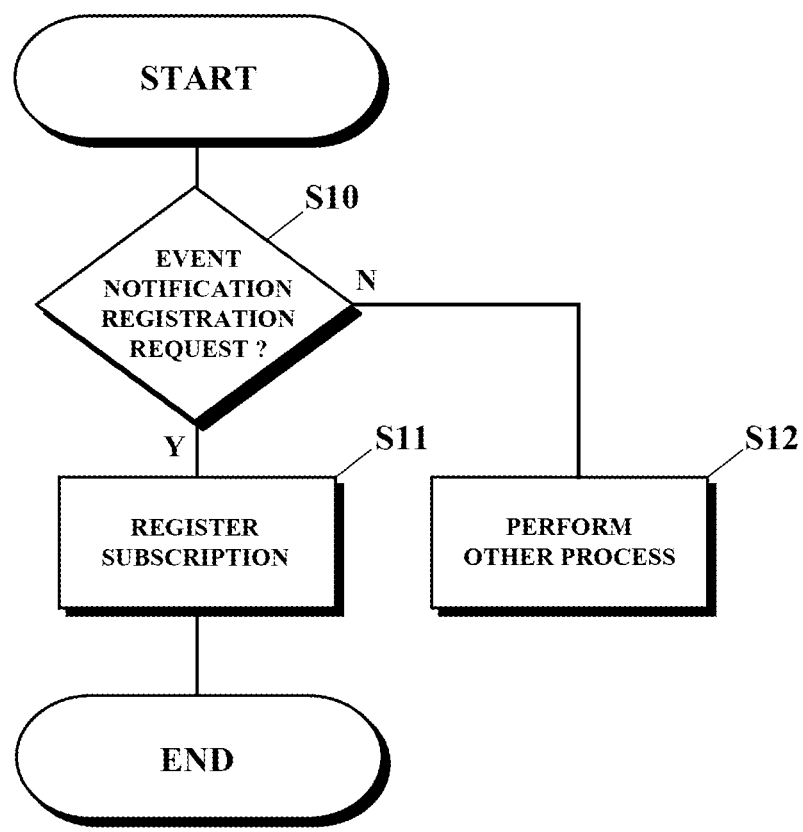
FIG. 6B is a flowchart illustrating process performed by a subscription manager.

FIG. 6B is a flowchart illustrating the process performed by the subscription manager 720 for the request for event notification registration.

In step S10, the flow proceeds to step S11 when it is determined that the event type is a request for event notification registration; otherwise, the flow proceeds to step S12.

In Step S11, the subscription manager 720, with reference to the event type table 81, converts the event type included in the event notification registration request message into an event type code, generates a subscription ID, obtains the current date and time as a time stamp, and sets a validity flag to "1". The subscription manager 720 registers a row including the subscription ID, the event type code, the value of the time stamp, and the IP address of a requester in the subscription table 83 as a subscription. Still further, the subscription manager 720 sends a response message including the subscription ID to the subscriber 66. Alternatively, when the event type code is 01, the subscription manager 720 registers a row including the subscription ID, the event type code, the value of the time stamp, the user ID, and the IP address of a requester in the subscription table 83 as a subscription. Further, the subscription manager 720 sends a response message including the subscription ID to the subscriber 66. Then the process illustrated in FIG. 6B ends.

Figure 9:
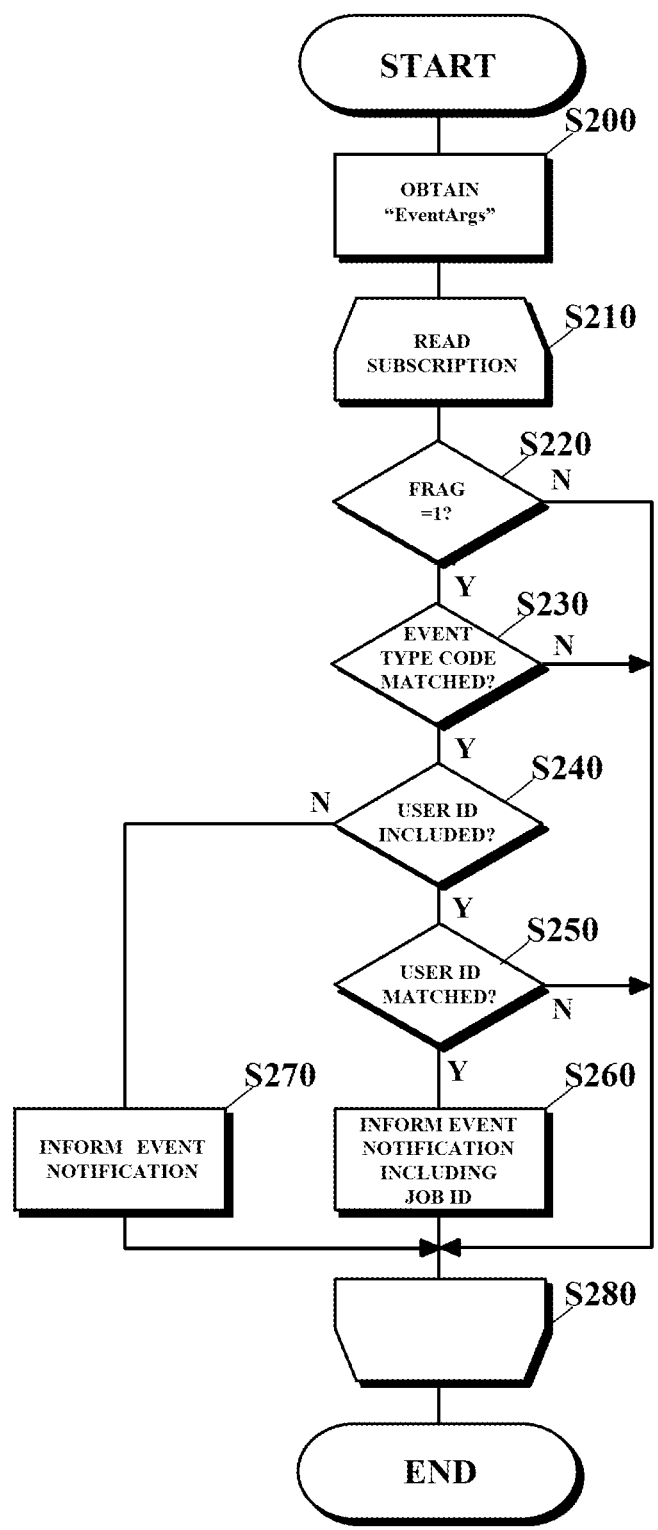
FIG. 9 is a flowchart illustrating process performed by the event notification manager when print job data includes a user ID.

The subscriber 66 stores the subscription ID, for example, for use in the process illustrated in FIG. 9.

In step S12, other processes are performed in accordance with a request, and the process illustrated in FIG. 6B ends.

The subscription manager 720 may periodically perform the process for updating the validity flags in the subscription table 83. In other words, for each row of the subscription table 83, when the validity flag is "1" and the difference between the current date and time and the time stamp included in the row is larger than or equal to the lifetime, the subscription manager 720 sets the validity flag to "0" and notifies the subscriber 66 in the terminal having the IP address included in the row of expiration of the lifetime.

The subscriber 66 may display the notification of expiration of the lifetime as a pop-up message in the UI unit 671. The validity flags may be set to "1" and the time stamp may be updated to the current time. The validity flags may be set as a result of a renewal request with the subscription ID being issued to the subscription manager 720 via the event notification setting unit 65 and the subscriber 66.

Figure 7:
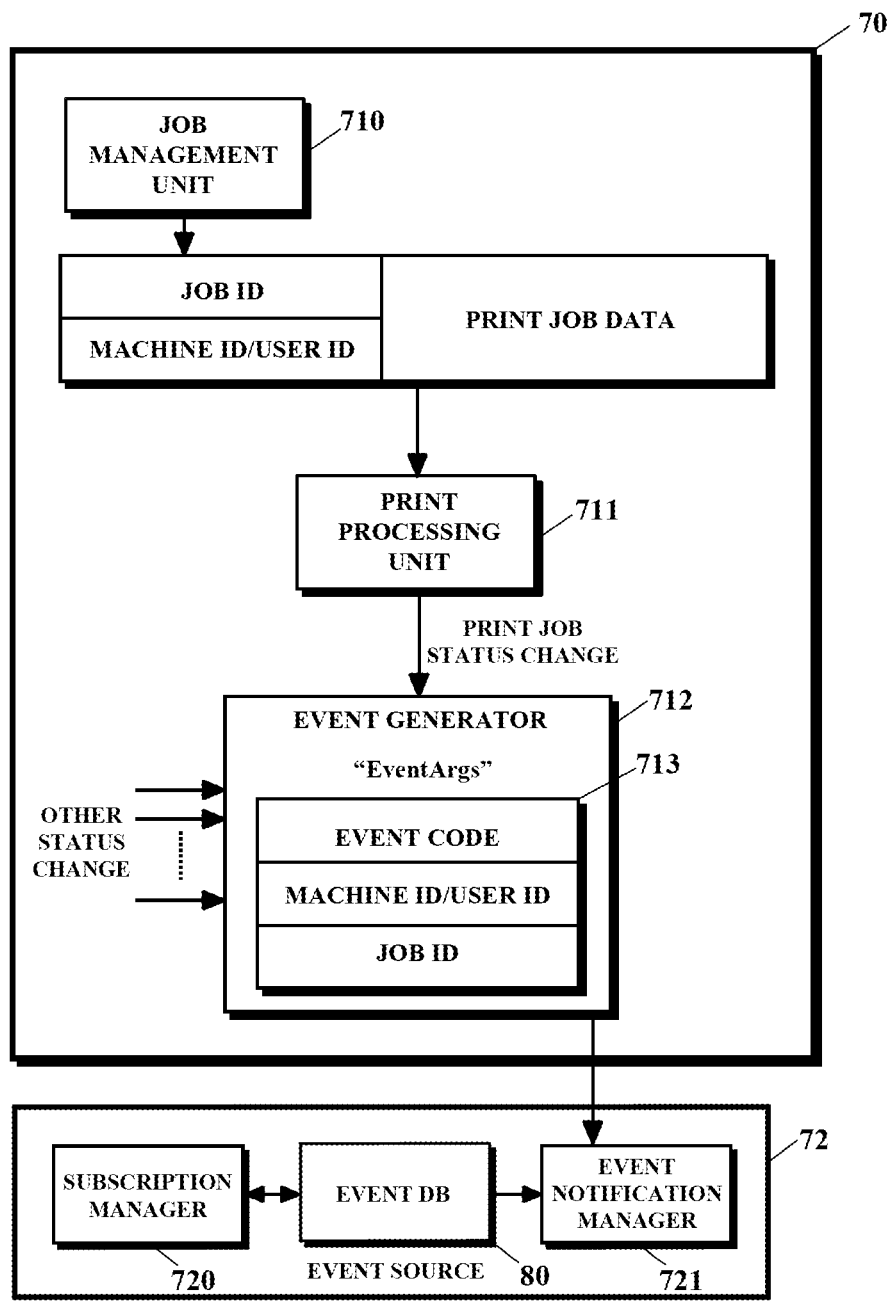
FIG. 7 is a schematic diagram illustrating functional configurations of the relationship between print job process and an event notification manager in the image forming device.

FIG. 7 is a schematic diagram illustrating the functional configurations of the relationship between print job process and the event notification manager 721 in the image forming device 20.

The job data received from the second communication unit 71 of the image forming device 20 is stored in the first DRAM 44 illustrated in FIG. 2. The header of the print job includes the machine ID or the user ID. The machine ID or the user ID is provided to the print job by the printer driver in the PC 10. Note that, for example, the machine ID is the IP address of the PC 10. The IP address may be the sender's IP address that has been provided to the HTTP header.

A job management unit 710, receiving the job, attaches the job ID to the job. The job ID may not be the same as the job ID that is submitted at the same time to another image forming device by the PC. Job IDs are unique by at least one of the machine ID of the image forming device 20, the IP address of the image forming device 20, and the user ID.

A print processing unit 711 calls an event generator 712 (712A in FIG. 12) at points of time when the status of the print job changes. For example, the print processing unit 711 calls the event generator 712 when the process is started, when printing is stopped, when printing is temporarily stopped and/or restarted, and when printing is completed. When the job status changes in this manner, the event generator 712 sets the event code corresponding to the point of time among the event codes 0100-0104 illustrated in FIG. 5B. Further, the event generator 712 sets the machine ID or the user ID as data of a data structure or a value of "EventArgs" 713 (event data) (713A in FIG. 12), which is an instance of a class, and calls the event notification manager 721, which is an event handler. The event generator 712, upon the occurrence of other status changes, sets the event code indicating the change. Further, event generator 712 sets the machine ID or the user ID, and the job ID with a "NULL" value as the values of the "EventArgs" 713, and calls the event notification manager 721, which is the event handler.

Figure 8:
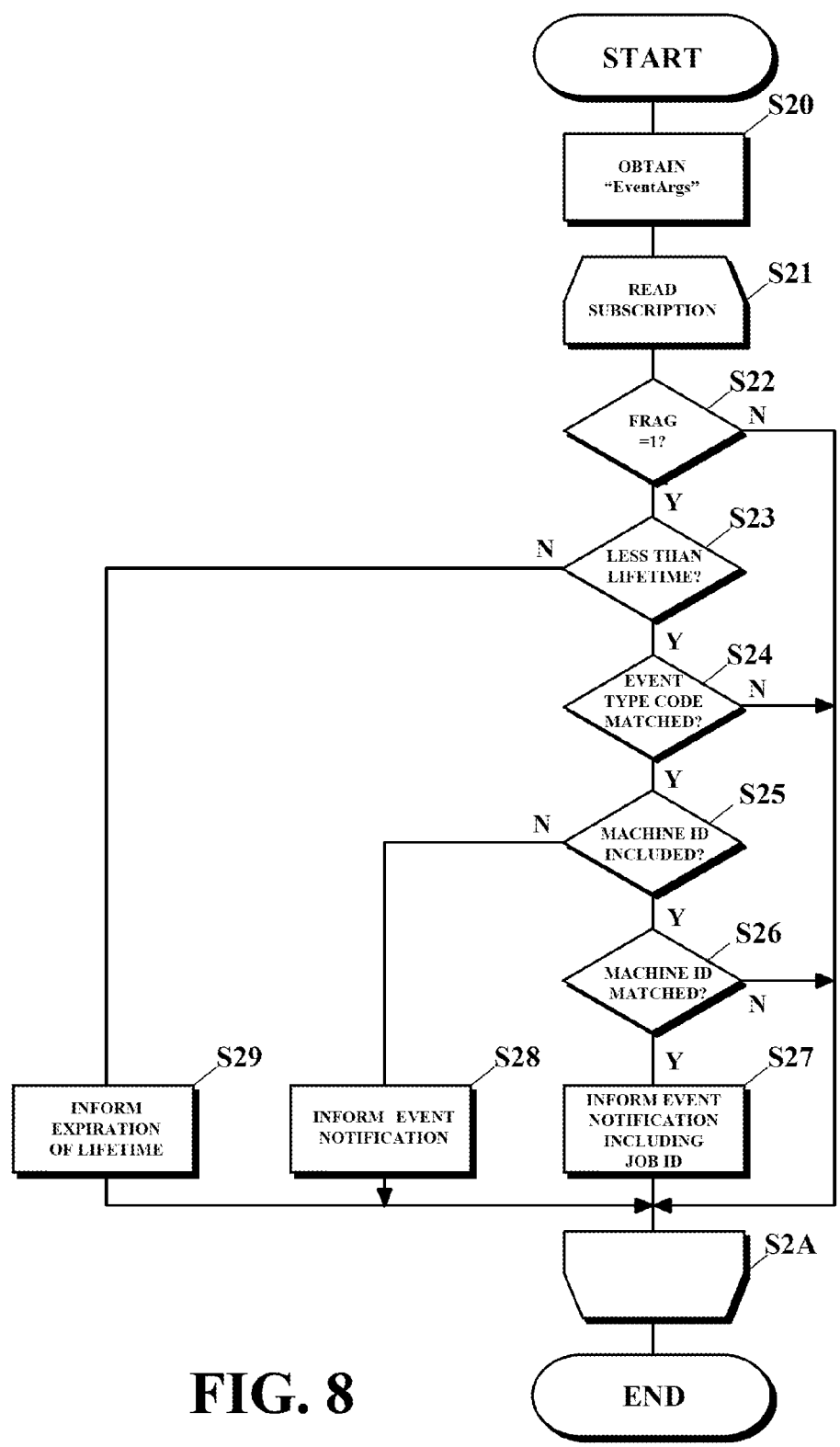
FIG. 8 is a flowchart illustrating process performed by the event notification manager when print job data includes a machine ID.

In response to the above-described calls, the event notification manager 721 starts the process illustrated in FIG. 8 or FIG. 9.

Case in which the job data includes the machine ID

FIG. 8 is a flowchart illustrating the process performed by the event notification manager when the print job data includes the machine ID.

In step S20 in FIG. 8, the content of the "EventArgs" 713 is obtained. Then, the process of the following steps S21 to S2A is performed for each row of the subscription table 83.

In step S21, the row of data (subscription) is read from the subscription table 83.

In step S22, the flow proceeds to step S23 when the validity flag of the read subscription row is "1"; otherwise, the flow proceeds to step S2A.

In step S23, the flow proceeds to step S24 when the difference between the time stamp included in the row and the current date and time is less than the lifetime; otherwise, the flow proceeds to step S29.

In step S24, the flow proceeds to step S25 when the event type code in the row is matched with the event type code that is the two highest-order digits of the event code in the "EventArgs" 713; otherwise, the flow proceeds to step S2A.

In step S25, the flow proceeds to step S26 when the "EventArgs" 713 includes a machine ID, that is, when the machine ID is not "NULL", and the flow proceeds to step S28 when the machine ID is not included.

In step S26, the flow proceeds to step S27 when the machine ID is matched with the IP address in the row; otherwise the flow proceeds to step S2A.

In step S27, notification information for notifying the event sink 670 in the terminal having the IP address included in the row of generation of an event corresponding to the event code is provided to the second SOAP processing unit 73.

The second SOAP processing unit 73 converts (serializes) the notification information into the SOAP message in XML, and transmits the SOAP message to the PC 10 via the second communication unit 71 and the network 30. Next, the flow proceeds from step S27 to step S2A.

The notification information includes the name of the event type corresponding to the two highest-order digits of the event code in the "EventArgs" 713, the name of the event corresponding to the event code, the job ID in the "EventArgs" 713, and the date and time of the event generation, which is the current date and time.

The SOAP message is converted into an object by the first SOAP processing unit 69, transferred to the event sink 670, recorded in the event log unit 68, and the content of the notification information is displayed as the pop-up message in the dialog box by the UI unit 671.

In step S28, the same process as that in step S27 is performed. However, the content of the notification information does not include the job ID.

In step S29, the validity flag of the row is set to "0" via the subscription manager 720, and notification information is provided to the second SOAP processing unit 73 to inform the subscriber 66 in the host having the IP address included in the row of expiration of the lifetime.

When the notification information is transferred to the subscriber 66, the subscriber 66 makes the UI unit 671 display the content of the notification information as the pop-up message. A renewal request is issued to the subscription manager 720 through the event notification setting unit 65 and the subscriber 66. As such, the validity flag is set to "1" and the time stamp is updated to the current time via the event notification setting unit 65 and the subscription manager 720.

In step S2A, the flow returns to step S21 when the processed row is not the last row of the subscription table 83, and the process illustrated in FIG. 8 ends when the processed row is the last row.

Case in which the print job data includes the user ID

FIG. 9 is a flowchart illustrating the process performed by the event notification manager when the print job data includes the user ID.

In step S200 in FIG. 9, the content of the "EventArgs" 713 is obtained. Then, the process of the following steps S210 to S280 is performed for each row of the subscription table 83.

In step S210, the row of data (subscription) is read from the subscription table 83.

In step S220, the flow proceeds to step S230 when the validity flag of the read subscription row is "1"; otherwise, the flow proceeds to step S280.

In step S230, the flow proceeds to step S240 when the event type code in the row is matched with the event type code which is the two highest-order digits of the event code in the "EventArgs" 713; otherwise, the flow proceeds to step S280.

In step S240, the flow proceeds to step S250 when the user ID is included in the "EventArgs" 713, that is, when the user ID is not "NULL", and the flow proceeds to step S270 when the user ID is not included.

In step S250, the flow proceeds to step S260 when the user ID is matched with the user ID in the row; otherwise the flow proceeds to step S280.

In step S260, the notification information for notifying the event sink 670 in the terminal having the IP address included in the row of generation of the event corresponding to the event code is provided to the second SOAP processing unit 73.

The second SOAP processing unit 73 converts (serializes) the notification information into the SOAP message in XML, and transmits the SOAP message to the PC 10 via the second communication unit 71 and the network 30. Next, the flow proceeds from step S260 to step S280.

The notification information includes the name of the event type corresponding to the two highest-order digits of the event code in the "EventArgs" 713, the name of the event corresponding to the event code, the job ID in the "EventArgs" 713, and the date and time of the event generation, which is the current date and time.

The SOAP message is converted into an object by the first SOAP processing unit 69, transferred to the event sink 670, recorded in the event log unit 68, and the content of the notification information is displayed as the pop-up message in the dialog box by the UI unit 671.

In step S270, the same process as that in step S260 is performed. However, the content of the notification information does not include the job ID.

In step S280, the flow returns to step S210 when the processed row is not the last row of the subscription table 83, and the process illustrated in FIG. 9 ends when the processed row is the last row.

When the print job data includes the user ID and the job ID, for example, the desktop PC and the notebook PC are used with the same user ID (the user ID for logging into the OS) and, in the notebook PC, setting has been made such that the UI unit 671 is automatically activated after the OS is booted.

Accordingly, the OS of the desktop PC is activated. As a result of the activation, the processing steps illustrated in FIG. 6A and FIG. 6B are performed and a row, in which "SubscriptionID"=1, of the subscription table 83 is registered. Then, after a user has requested the image forming device 20 to process a print job, using the desktop computer, the user moves away from the desktop computer, for example, to attend a meeting and the OS of the notebook PC is activated. As a result of this activation, the steps illustrated in FIG. 6A and FIG. 6B are performed, whereby the row, in which "SubscriptionID"=2, of the subscription table 83 is registered. After that, when the print process is completed and the process illustrated in FIG. 9 is performed, the notification indicating the completion of the print job is sent only to the two PCs of the user. It should be noted that the notification is sent even when the OS of the notebook PC is activated before requesting the process of the print job.

Figure 10:
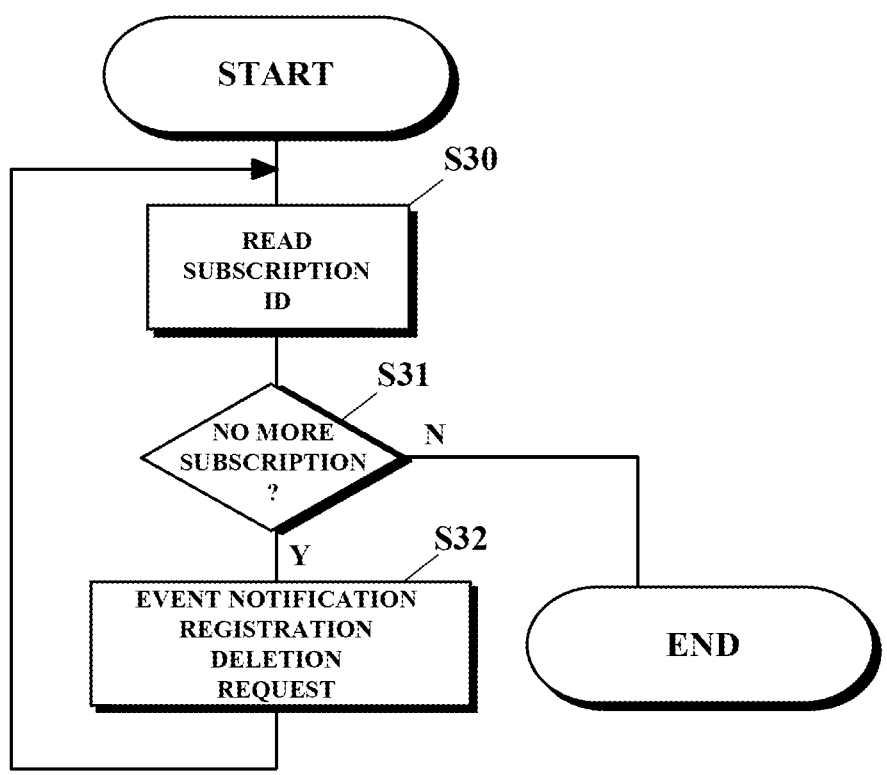
FIG. 10 is a flowchart illustrating process for event notification registration deletion request performed by the subscriber.

FIG. 10 is a flowchart illustrating the process for the event notification registration deletion request performed by the subscriber 66. This process is performed as a result of the subscriber 66 being called by the OS when the OS stops operating. The steps S30-S32 are part of the loop process performed for each of all the stored subscriptions.

In step S30, one of the stored subscriptions is read.

In step S31, the process illustrated in FIG. 9 ends when there are no more subscriptions to be read, and the flow proceeds to step S32 when there is the subscription.

In step S32, the SOAP message, which includes the subscription ID, for an event notification registration deletion request ("Unsubscribe" request) is transmitted to the subscription manager 720, whereby the subscription is deleted, and the flow returns to step S30.

The subscription manager 720, in response to the event notification registration deletion request, deletes the row from the subscription table 83.

Accordingly, when the print job includes the machine ID and the job ID, the machine ID of the requester of the job process is set by the event generator 712 in the "EventArgs" 713 as event data when the status change within the image forming device 20 is the job status change. The event notification manager 721 only needs to send the notifications regarding the subscriptions in which the value of the status change pertains to the type of event and the notification address corresponds to the machine ID, among the subscriptions included in the subscription table 83 of the event DB 80. As a result, the process load on the image forming device 20 can be alleviated since there is no need to search a table (as before) every time the event is generated to determine whether or not the event is the type of event for which the notification needs to be sent to only the particular terminal.

Further, when the print job includes the user ID and the job ID, the subscriptions registered in the image forming device 20 includes not only the event type but also the user ID (refer to FIG. 5C) as the filter element when the event type is the job status, for example, "JobStatusEvent". In response to the generation of the event in the image forming device 20, the event notification manager 721, for the subscription in which the event type is the job status and the user ID is matched with the user ID included in the job data among the subscriptions included in the subscription table 83, sends the notification of the event to the notification address in the subscription. Hence, after the user has requested the image forming device 20 to process the job from the one PC, the same user can receive the notification of the change in the job using another PC from the image forming device 20. Further, since the notification of the event is sent to only these two PCs, increases in the process loads on the image forming devices 20-22 and the PCs 10-1N coupled to the network and the increase in the traffic of the network can be suppressed.

Second Embodiment

When the PC 10 enters a power saving mode, for example, a standby mode or sleep mode, processing illustrated in FIG. 10 is performed in the PC 10 in response to generation of the event of entering a power saving mode. When the PC 10 leaves the power saving mode, the process illustrated in FIG. 6A and the process illustrated in FIG. 6B are respectively performed in the PC 10 and the image forming device 20, in response to the generation of the event of leaving the power saving mode.

FIG. 11 is a schematic diagram illustrating the configuration of the subscription table 83A according to the second embodiment.

In the subscription table 83A, the user ID is integrated into the event type code unlike in the subscription table 83 illustrated in FIG. 5C. For example, the event type code "01" and the user ID "TARO.SUZUKI", which are respectively filter elements of the first row of the table illustrated in FIG. 5C, are combined together into a combined event type code "TARO.SUZUKI:01" (single filter element) in the subscription table 83A.

Figure 12:
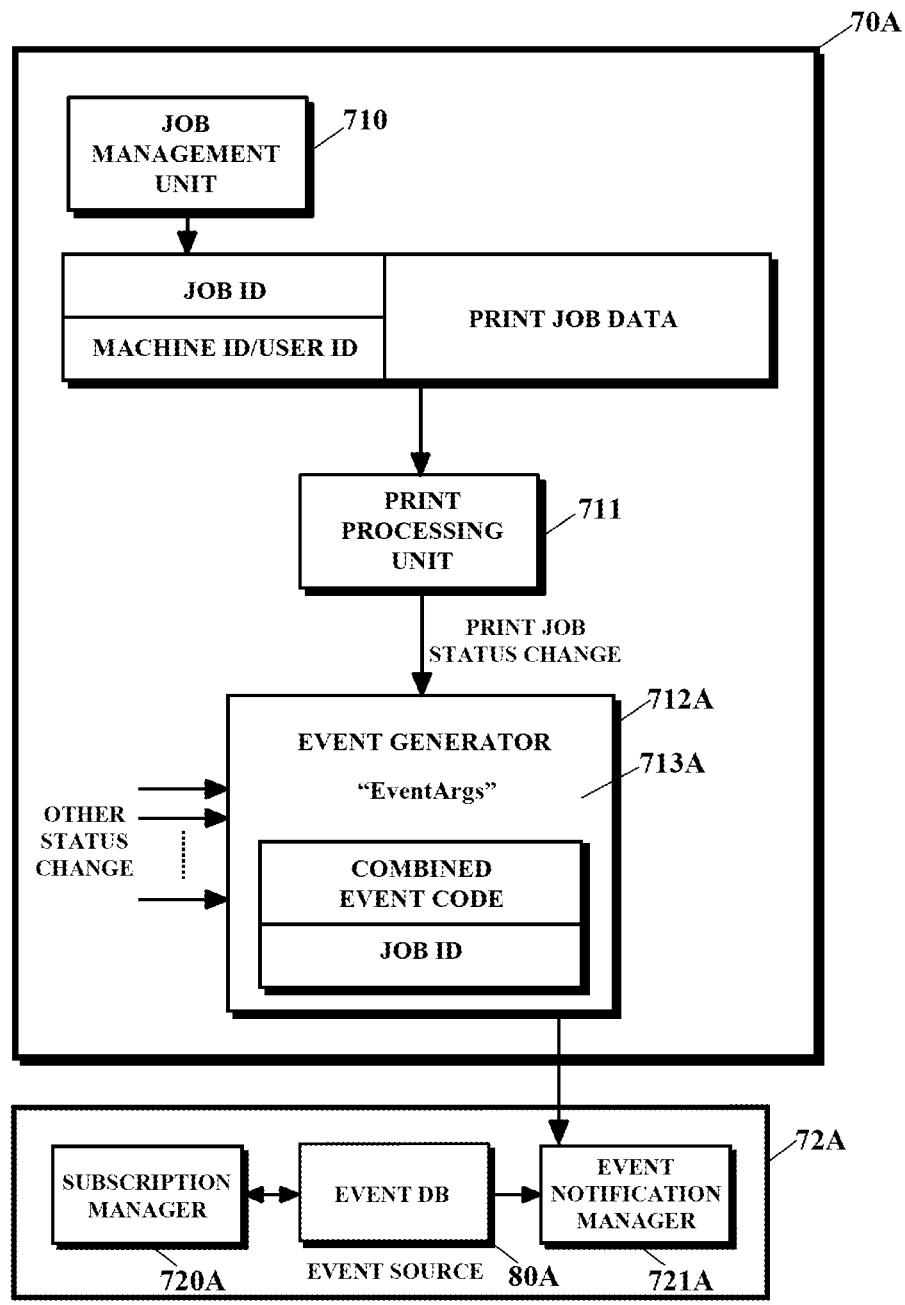
FIG. 12 is a schematic diagram illustrating functional configurations of the relationship between the print job process and the event notification manager in the image forming device according to a second embodiment.

FIG. 12 is a schematic diagram illustrating the functional configurations of the relationship between the print job process and the event notification manager 721A in the image forming device 20 according to the second embodiment.

"EventArgs" 713A, in which the user ID is integrated into the event code, are different from the "EventArgs" 713 illustrated in FIG. 7. For example, the event code "0104" and the user ID "TARO.SUZUKI" in the "EventArgs" 713 illustrated in FIG. 7 are combined together into the combined event code "TARO.SUZUKI:0104" in the "EventArgs" 713A illustrated in FIG. 11.

Figure 13:
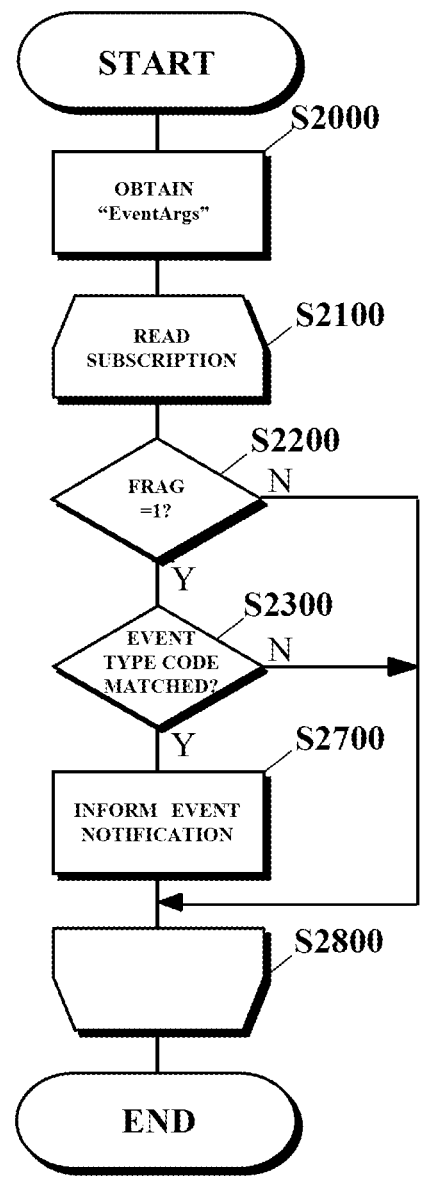
FIG. 13 is a flowchart illustrating process performed by the event notification manager according to the second embodiment.

FIG. 13 is a flowchart illustrating the process performed by the event notification manager 721A according to the second embodiment.

The flowchart illustrated in FIG. 13 does not include steps S240, S250 and S260 illustrated in FIG. 9. However, in step S2700, the content of an event notification includes the job ID when the job ID is included in the "EventArgs" 713A.

The configurations of the second embodiment illustrated in FIG. 11, FIG. 12, and FIG. 13, other than the above-described configurations, are similar with the configurations of the first embodiment illustrated in FIG. 5C, FIG. 7, and FIG. 9.

According to the second embodiment, when the event type is the job status, the event code includes the user ID, and the subscription in the subscription table 83A includes a single filter element which is the combination of the event type code and the user ID. As a result, the event notification manager 721A may perform filtering for each subscription by determining whether or not the filter element is the same as the event code from which a portion (sub code) has been removed, irrespective of whether or not the user ID exists. Hence, the process in the image forming device 20 of the second embodiment becomes simpler than the process in the image forming device 20 of the first embodiment, whereby a processing load on the image forming device 20 is alleviated.

Note that the combined event code "TARO.SUZUKI: 0104" may be changed to be "0401:TARO.SUZUKI", in which the user ID and the event code are arranged in the reverse order, and the two highest-order digits and the two lowest-order digits of the combined event code are arranged in the reverse order. In step S2300 illustrated in FIG. 13, the process may be performed under the condition that the combined code has been changed to be a combined event type code "01:TARO.SUZUKI" by removing the two highest-order digits, and the combined event type code "01: TARO.SUZUKI" is used also in the subscription table 83A.

The present disclosure of the embodiment includes various other embodiments. For example, other designs may be used in which the above-described components are each present.

For example, in the first and second embodiments, although the name of an event type is "JobStatusEvent", "PrintJobStatusEvent" for a print job or "ScanJobStatusEvent" for a scan job may be used.

The database used in step S0 illustrated in FIG. 6A is not limited to the registry 64, and may be another database.

The event sink 670 may be activated when a printer driver is activated and deactivated when the printer driver is deactivated. Further, by providing a resident application formed of the subscriber 66 and the event sink 670, the resident application may be activated when the OS is activated.

The image forming devices 20-22 coupled to the network 30 include at least one of a multi-function peripheral (MFP), a printer, a scanner, a facsimile, and another device.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An event notification system comprising:
a terminal that includes a first memory unit; and
a plurality of image forming devices, wherein each of the plurality of image forming devices includes a processor and a second memory unit, and wherein the plurality of image forming devices is configured to be coupled to the terminal via a network, and process a job provided from a plurality of printer drivers corresponding to the plurality of image forming devices in the terminal,
and wherein the second memory unit includes:
a database in which a subscription is registered on the basis of an event notification registration request provided from a subscriber in the terminal, wherein the subscription includes an event type and a notification address;
an event generator;
an event notification manager; and
a subscription manager,
wherein the first memory unit includes:
a status monitor that is notified by the event notification registration request and displays an event;
a registry in which the plurality of printer drivers is registered; and
a subscriber,
wherein each of the plurality of the printer drivers includes an event notification setting unit that sets printing parameters such that the status monitor is on or off, wherein an event notification is sent or not for each type of event, wherein the setting of printing parameters is registered in the form of a tree structure, wherein values and data type entries are read and/or written by specifying paths of the tree structure,
wherein the event generator is configured to cause the processor to generate the event including event data and a value indicating a status change within the image forming device, wherein when the status change indicates a status change of the job, a value indicating a requestor of a job process is included in the event data,
wherein, in response to the event generation, (i) when the event data includes the value indicating the requester of the job process, the event notification manager is configured to cause the processor to send the event notification to the notification address included in the subscription, among other subscriptions included in the database, wherein the event notification includes the value indicating the status change as the event type and the value indicating the requester of the job process, and (ii) when the event data does not include the value indicating the requester of the job process, the event notification manager is configured to cause the processor to send the event notification to the notification address included in the subscription, among the other subscriptions included in the database, and wherein the event notification includes the value indicating the status change as the event type,
wherein the subscriber is configured to (i) obtain an entry having a StatusMonitor key by scanning keys of a group of keys for the plurality of printer drivers existing below a path of a Printers key, on the basis of setting information regarding the plurality of printer drivers registered in the registry, (ii) obtain an entry having a key including Notification from the group of keys that include the StatusMonitor key, (iii) when the value indicates that the event notification is sent, obtain the event type, and (iv) send the event notification registration request requesting Subscription including the event type as the value of a Filter element to the subscription manager, and
wherein the subscription manager is configured to register a row as the subscription, and wherein the row includes the event type, the notification address, and a time stamp in a subscription table.

2. The event notification system according to claim 1, wherein the event generator is further configured to cause the processor to include a job ID in the event data when the status change indicates the status change of the job, and
wherein in response to the event generation, when the job ID is included in the event data, the event notification manager is further configured to cause the processor to send the event notification further including the job ID to the notification address.

3. The event notification system according to claim 1, wherein the value indicating the requester of the job process includes a machine ID of the requester of the job process.

4. The event notification system according to claim 3, wherein the machine ID includes an IP address of the terminal.

5. The event notification system according to claim 4, wherein the IP address is provided to an HTTP header.

6. The event notification system according to claim 1, wherein the value indicating the requester of the job process includes a user ID of the requester of the job process.

7. The event notification system according to claim 6, wherein the user ID is for logging into an operating system.

8. The event notification system according to claim 1, wherein the subscription manager sends an expiration of a lifetime to the notification address when a difference between a current time and the time stamp is larger than or equal to the lifetime.

9. The event notification system according to claim 1, wherein the image forming device includes at least one of a printer, a scanner, a facsimile, and a multi-function peripheral (MFP).

10. A computer-implemented method comprising:
registering a subscription in a database based on an event registration request provided from a terminal, wherein the subscription includes an event type and a notification address;
setting printing parameters such that a status monitor in the terminal is on or off;
sending an event notification for each type of event, wherein the setting of printing parameters is registered in the form of a tree structure, and wherein values and data type entries are read and/or written by specifying paths of the tree structure;
generating, by at least a central processing unit, an event including event data and a value indicating a status change within an image forming device, wherein when the status change indicates a status change of a job, a value indicating a requestor of a job process is included in the event data;
sending, when the event data includes the value indicating the requester of the job process, an event notification to the notification address included in the subscription, among other subscriptions included in the database, wherein the event notification includes the value indicating the status change as the event type and the value indicating the requester of the job process, and sending, when the event data does not include the value indicating the requester of the job process, the event notification to the notification address included in the subscription, among the other subscriptions included in the database, wherein the event notification includes the value indicating the status change as the event type, obtaining an entry having a StatusMonitor key by scanning keys of a group of keys for a plurality of printer drivers for printers existing below the path of a Printers key, on the basis of setting information regarding the plurality of printer drivers in the terminal;

obtaining an entry having the key including Notification from the group of keys that include the StatusMonitor key;

obtaining the event type when the value indicates that the notification is sent; sending the event notification registration request requesting Subscription including the event type as the value of a Filter element; and registering a row as the subscription, and wherein the row includes the event type, the notification address, and a time stamp in a subscription table.

11. The computer-implemented method according to claim 10, wherein generating the event further comprises including a job ID in the event data when the status change indicates the status change of the job, and wherein, in response to generating the event, when the job ID is included in the event data, sending the event notification further comprises including the job ID in the notification address.

12. The computer-implemented method according to claim 10, wherein the value indicating the requester of the job process includes a machine ID of the requester of the job process.

13. The computer-implemented method according to claim 12, wherein the machine ID includes an IP address of the terminal.

* * * * *